US012673382B2

(12) United States Patent
Walther et al.

(10) Patent No.: US 12,673,382 B2
(45) Date of Patent: Jul. 7, 2026

(54) ULTRASONIC BONDING DEVICE AND WIRE GUIDING MODULE THEREFOR

(71) Applicant: Hesse GmbH, Paderborn (DE)

(72) Inventors: Frank Walther, Paderborn (DE); Sascha Bistry, Paderborn (DE)

(73) Assignee: Hesse GmbH, Paderborn (DE)

( * ) Notice: Subject to any disclaimer, the term of this patent is extended or adjusted under 35 U.S.C. 154(b) by 0 days.

(21) Appl. No.: 18/890,891

(22) Filed: Sep. 20, 2024

(65) Prior Publication Data

US 2025/0010394 A1 Jan. 9, 2025

Related U.S. Application Data

(63) Continuation of application No. PCT/DE2023/100211, filed on Mar. 20, 2023.

(30) Foreign Application Priority Data

Mar. 25, 2022 (DE) ..................... 10 2022 001 054.2

(51) Int. Cl.
*B23K 20/10* (2006.01)
(52) U.S. Cl.
CPC ................................... *B23K 20/10* (2013.01)
(58) Field of Classification Search
None
See application file for complete search history.

(56) References Cited

U.S. PATENT DOCUMENTS 4,763,826 A * 8/1988 Kulicke, Jr. ............ H01L 24/78
228/4.5
4,781,319 A 11/1988 Deubzer et al.
(Continued)

FOREIGN PATENT DOCUMENTS

DE 102020117641 A1 1/2022
EP 0922524 A1 6/1999
JP 2013171964 A 9/2013

OTHER PUBLICATIONS

Richardot Amandine, "Our best tips to optimize your designs for 3D printer powder removal I Sculpteo Blog", Mar. 26, 2018 (Mar. 26, 2018), p. 1-4, Retrieved from the Internet: URL:https://www.sculpteo.com/blog/2018/03/26/our-best-tips-to-optimize-your-designs-for-3d-printer-powder-removal/, XP093096097, [retrieved on Oct. 30, 2023].

*Primary Examiner* — Devang R Patel
(74) *Attorney, Agent, or Firm* — Leydig, Voit & Mayer, Ltd.

(57) ABSTRACT

An ultrasonic bonding device includes a bonding head movable and/or positionable in a movement axis and rotatable and/or positionable about a rotational axis. The bonding head has a tool for ultrasonically bonding a bonding wire and a transducer module for exciting the tool to produce ultrasonic vibrations. The ultrasonic bonding device further includes: a stationary wire supply for the bonding wire; an elongated wire feed that is cylindrical in cross-section; a first wire guiding module having an inlet and outlet opening for the bonding wire, and being associated with the tool such that bonding wire emerging from the outlet opening is guided under the tool; and a second wire guiding module having an elongated guide channel for the bonding wire, the second guide channel having an inlet and outlet opening, the second wire guiding module being provided between the wire feed and the first wire guiding module.

5 Claims, 6 Drawing Sheets

(56)  References Cited

U.S. PATENT DOCUMENTS

| | | | | |
|---|---|---|---|---|
| 4,789,093 | A * | 12/1988 | Bansemir | H01L 24/78 228/1.1 |
| 4,928,871 | A * | 5/1990 | Farassat | H01L 24/85 228/180.5 |
| 5,452,838 | A * | 9/1995 | Farassat | B23K 20/10 228/1.1 |
| 5,564,616 | A * | 10/1996 | Torihata | H01L 24/78 228/180.5 |
| 5,685,476 | A * | 11/1997 | Miyoshi | H01L 24/78 228/8 |
| 5,906,706 | A * | 5/1999 | Farassat | H01L 24/85 228/1.1 |
| 6,439,448 | B1 | 8/2002 | Ringler | |
| 6,616,030 | B2 * | 9/2003 | Miller | B23K 20/10 228/110.1 |
| 6,619,530 | B2 * | 9/2003 | Ushiki | B23K 20/004 228/180.5 |
| 7,954,689 | B2 * | 6/2011 | Kwan | H01L 24/78 228/904 |
| 8,434,669 | B1 * | 5/2013 | Cheng | B23K 20/004 228/904 |
| 8,459,530 | B2 * | 6/2013 | Zhang | H01L 24/78 228/180.5 |
| 9,865,563 | B2 * | 1/2018 | Takagi | H01L 24/78 |
| 2019/0237427 | A1 | 8/2019 | Klaerner et al. | |
| 2023/0123439 | A1 | 4/2023 | Unger et al. | |

* cited by examiner

ULTRASONIC BONDING DEVICE AND WIRE GUIDING MODULE THEREFOR

CROSS-REFERENCE TO PRIOR APPLICATION

This application is a continuation of International Patent Application No. PCT/DE2023/100211, filed on Mar. 20, 2023, which claims priority to German Patent Application No. DE 10 2022 001 054.2, filed on Mar. 25, 2022. The entire disclosure of both applications is hereby incorporated by reference herein.

FIELD

The invention relates to an ultrasonic bonding device, a wire guiding module that can be used as a wire guiding module of the ultrasonic bonding device, and the use of the ultrasonic bonding device and/or the wire guiding module for the ultrasonic wire bonding and in particular the ultrasonic ribbon bonding.

BACKGROUND

The wire guiding module of an ultrasonic bonding device is used to guide the bonding wire, provided in a wire supply, under the tool of the ultrasonic bonding device in a collision-free and reliable manner. The tool and the wire guiding module are designed as components of the bonding head and are moved with the bonding head. Depending upon the design of the ultrasonic bonding device, the bonding head can be moved in up to three movement axes, oriented at right angles to each other, and one rotational axis. The rotational axis and one movement axis typically extend vertically. Two further movement axes of the ultrasonic bonding device are usually extended horizontally.

The rotating supply of the ultrasonic bonding device is stationary and does not move with the bonding head. The bonding wire is therefore deformed during the movement of the bonding head and in particular twisted or otherwise bent. The torsion or bending of the bonding wire can now lead to the bonding wire leaving the wire guiding module in a geometrically indeterminate manner and not being positioned exactly under the tool. The subsequent bond cannot be executed or cannot be executed properly in this case.

SUMMARY

In an embodiment, the present invention provides an ultrasonic bonding device, comprising: a bonding head movable and/or positionable in at least one movement axis and rotatable and/or positionable about a rotational axis, the bonding head having a tool configured to ultrasonically bond a bonding wire and a transducer module configured to excite the tool to produce ultrasonic vibrations; a stationary wire supply for the bonding wire; an elongated wire feed that is cylindrical in cross-section; a first wire guiding module having an inlet opening and an outlet opening for the bonding wire, the first wire guiding module being associated with the tool such that bonding wire emerging from the outlet opening is guided under the tool; and a second wire guiding module having an elongated guide channel for the bonding wire, the second guide channel having an inlet opening and an outlet opening, the second wire guiding module being provided between the wire feed and the first wire guiding module, wherein the first and the second wire guiding modules each comprise part of the bonding head, and wherein, on the bonding head, a holder is provided by which an end of the wire feed facing the second wire guiding module is fixed on the bonding head.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
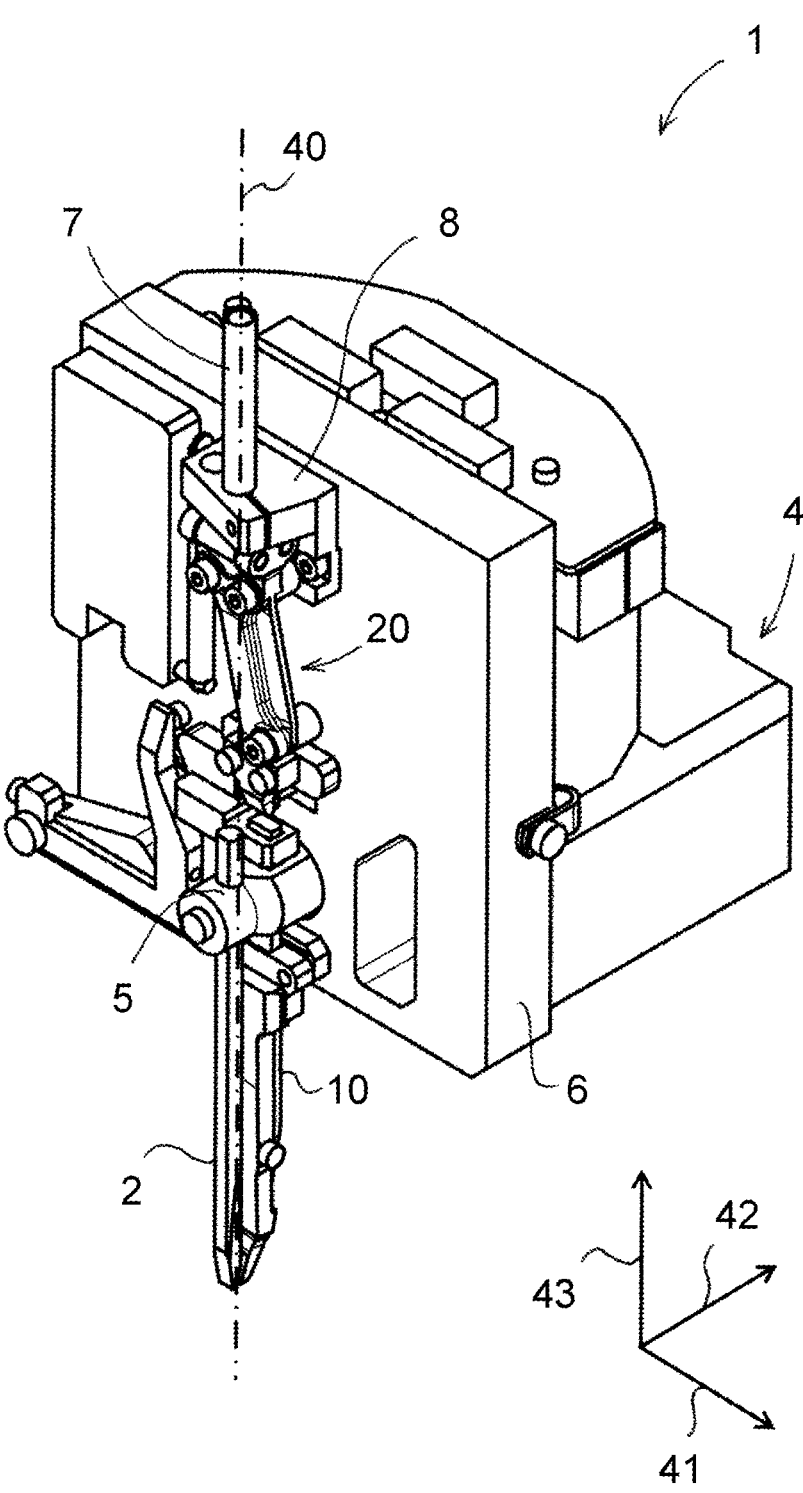
FIG. 1 is a partial perspective view of a bonding head of an ultrasonic bonding device according to the invention with a wire guiding module.

In an embodiment, the present invention provides an improved ultrasonic bonding device and a wire guiding module therefor.

In an embodiment, the present invention provides an ultrasonic bonding device that comprises a bonding head which can be moved and/or positioned in at least one movement axis and can be rotated and/or positioned about a rotational axis and which provides a tool for ultrasonic bonding of a bonding wire and a transducer module for exciting the tool to ultrasonic vibrations, as well as a stationary wire supply for the bonding wire. Furthermore, the ultrasonic bonding device comprises an elongated wire feed which is cylindrical in cross-section and preferably tubular and/or hose-like, a first wire guiding module which provides an inlet opening and an outlet opening for the bonding wire and which is associated with the tool in such a way that the bonding wire emerging from the outlet opening is guided under the tool. Furthermore, the ultrasonic bonding device comprises a second wire guiding module which provides an elongated guide channel for the bonding wire with an inlet opening and an outlet opening, and which is provided between the wire feed and the first wire guiding module. The first and second wire guiding modules are implemented as part of the bonding head. The bonding head is also provided with a holder with which an endOptionally, as part of the ultrasonic bonding device, a wire buffer for the bonding wire is provided, which moves with the bonding head in relation to the at least one movement axis and can be installed in a rotationally fixed manner with respect to the rotational axis. The wire buffer can be assigned a wire feed module which is configured to feed the bonding wire from the stationary wire supply into the wire buffer.

The particular advantage of the invention is that, by providing the second wire guiding module, the bonding wire exits the first wire guiding module torsion-free or quasi torsion-free and is positioned under the tool tip of the tool. This significantly reduces the risk of losing the assignment of the bonding wire to the tool.

According to a further development of the invention, a distance of the guide channel to the rotational axis of the ultrasonic bonding device changes in an extension direction of the guide channel. In particular, the distance of the guide channel to the rotational axis is smaller in the region of the inlet opening than in the region of the outlet opening. The distance of the bonding wire, fed to the first wire guiding module in the guide channel of the second wire guiding module, from the rotational axis therefore increases during feeding. This makes it possible to feed the bonding wire to the first wire guiding module without torsion or bending, in particular vertically from above, if the rotational axis runs through the wire feed and the bonding tool, and the inlet opening of the first wire guiding module laterally associated with the tool is provided outside the rotational axis.

According to a further development of the invention, the inlet opening of the guide channel of the second wire guiding module is provided coaxially to the rotational axis, or the rotational axis runs through the inlet opening of the guide channel of the second wire guiding module. Advantageously, the bonding wire passes from the wire feed into the guide channel of the second wire guiding module without being additionally twisted or bent if an end portion, facing the second wire guiding module, of the wire feed is provided coaxially to the rotational axis of the bonding head. The end portion, facing the second wire guiding module, of the wire feed is preferably fixed to the bonding head and moves both translationally and rotationally.

Accordingly, the wire guiding module, which is used, for example, as a second wire guiding module of the ultrasonic bonding device, comprises a monolithic module body which provides an elongated guide channel for a bonding wire with an inlet opening and an outlet opening. In any case, the guide channel is partially closed on the outer surface side.

The particular advantage of the invention is that the module body, if it is monolithic, i.e., formed in one piece, can be manufactured cost-effectively. In addition, there is no need to stock and assemble various components of the module body. Since the module body and the wire guiding module as a whole define a wearing part of the ultrasonic bonding device, the cost advantage is multiplied over the service life or useful life of the ultrasonic bonding device.

According to a further development of the invention, the module body is manufactured by primary forming. Preferably, the module body is manufactured by an additive manufacturing process. The primary forming production also offers further cost advantages.

According to a further development of the invention, the module body provides receptacles for fastening means which serve to fasten the wire guiding module to an attachment part of the ultrasonic bonding device. For example, the module body provides fastening bushings as receptacles. An example of an attachment part is a module carrier for the bonding head of the ultrasonic bonding device. Advantageously, the receptacles can be designed as an integral part of the monolithic module body. This reduces the assembly effort and eliminates the need for precise alignment of the receptacles relative to the guide channel with its inlet and outlet openings.

According to a further development of the invention, the second wire guiding module provides two introduction surfaces for guiding the bonding wire, which are opposite one another and taper in a funnel shape in the direction of the outlet opening. For example, the guide surfaces are convexly curved and/or cylinder segment-shaped. Preferably, two guide rollers are provided upstream of the inlet opening of the guide channel, which are rotatably mounted relative to the module body. A gap for the bonding wire is formed between the guide rollers. The gap preferably has a constant gap width. Particularly preferably, the guide rollers have a cylindrical lateral surface which forms the introduction surfaces for the bonding wire. The abrasion or wear on the wire guiding module is advantageously reduced by providing the tapered and in particular convexly curved or cylinder segment-shaped guide surfaces. This effect is further enhanced by the provision of guide rollers, since the wear is distributed over the lateral surface due to the rotational movement of the guide rollers. This significantly increases the service life of the wire guiding module.

According to a further development of the invention, a gap width of the gap formed between the guide rollers is adapted to the dimension of the bonding wire. For example, the gap is 50 µm wider than the thickness or diameter of the bonding wire.

The ultrasonic bonding device and the wire module are used, for example, in ribbon bonding. The ribbon made of aluminum or copper typically has a width of 500 µm to 2,000 µm and a thickness of 100 µm to 400 µm. For example, ribbons with cross-sections of 2,000 µm×300 µm or 1,500 µm×200 µm are used. The gap width is then 250 µm for the 200 µm thick ribbons or 350 µm for the 300 µm thick ribbons.

By making the gap only slightly wider than the thickness of the ribbon, twisting of the ribbon is prevented. This also reduces wear and prevents torsion of the ribbon.

Figure 2:
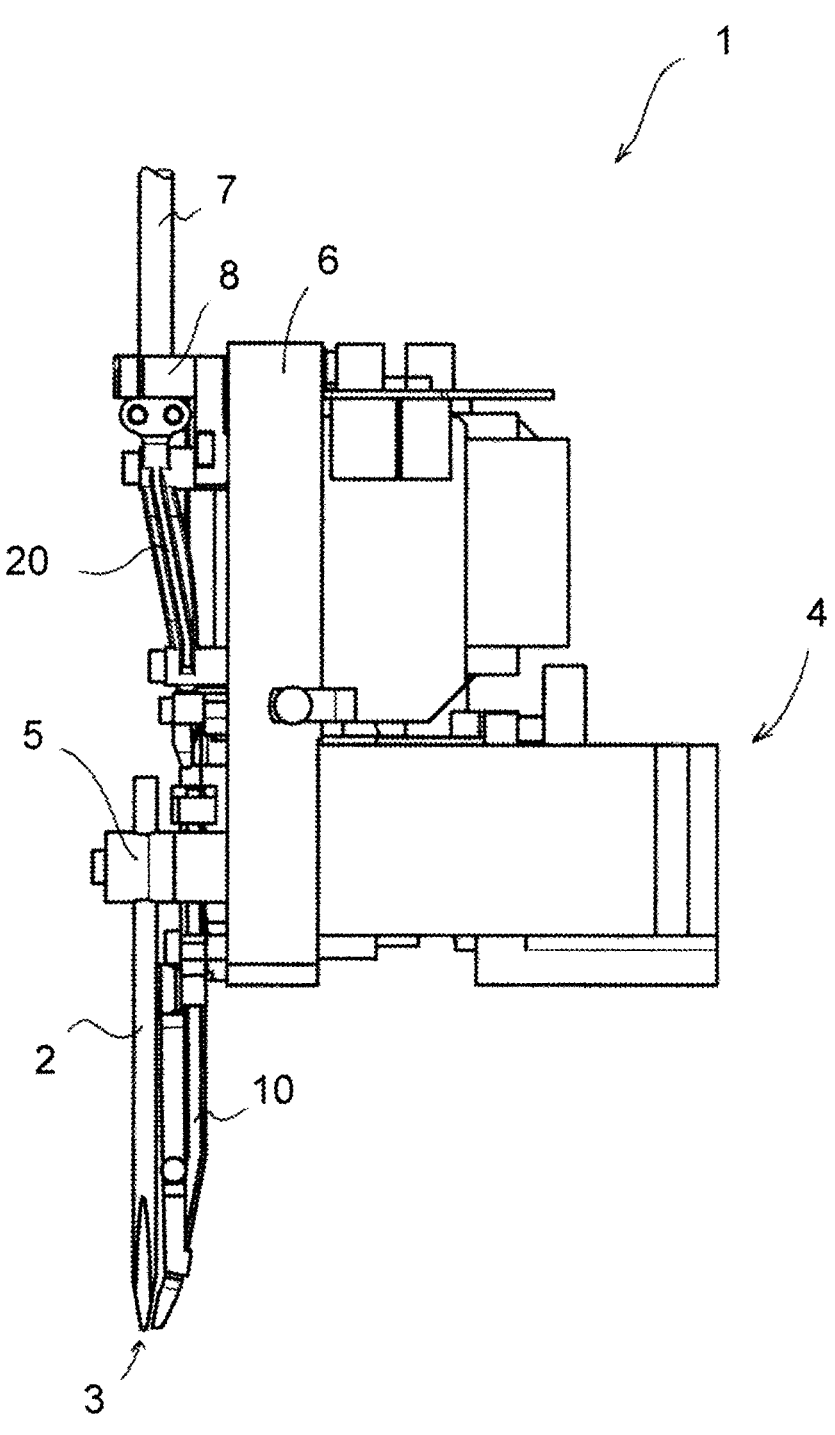
FIG. 2 is a side view of the partial representation of the bonding head according to FIG. 1.
Figure 3:
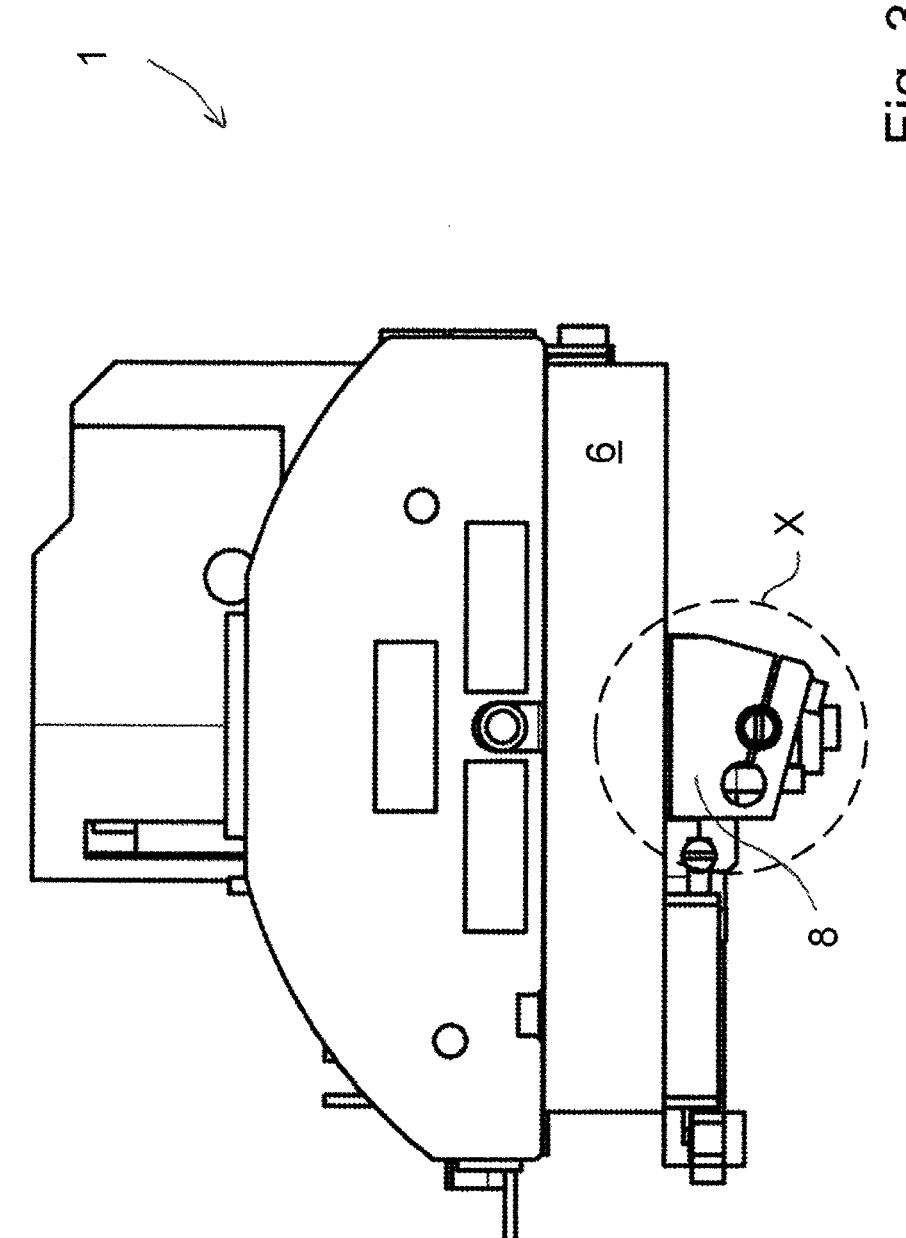
FIG. 3 is a plan view of the partial representation of the bonding head according to FIG. 1.

A bonding head 1 of an ultrasonic bonding device is partially shown in FIGS. 1 to 3. Shown in particular are a tool 2 of the ultrasonic bonding device with a tool tip 3, a transducer module 4, which serves to excite the tool 2 to ultrasonic vibrations and on which the tool 2 is held by means of a tool receptacle 5, as well as a first wire guiding module 10, a second wire guiding module 20, and an end portion, facing the second wire guiding module, of a tubular or hose-like wire feed 7, through which a bonding wire 15 to be bonded by means of the tool 2, not shown in FIGS. 1 to 3, is fed from a wire supply, also not shown, to the ultrasonic bonding device.

For the sake of clarity, further functional components of the ultrasonic bonding device and the bonding head 1 are not shown. These include, for example, a camera module and/or a lighting module and/or a knife module for cutting the bonding wire 15 after bonding.

The bonding head 1 can be moved and positioned horizontally and vertically in three mutually orthogonal movement axes 41, 42, 43. In addition, the bonding head 1 can be rotated and positioned about a vertical rotational axis 40.

The first wire guiding module 10 is associated with the side of the tool 2. It serves to redirect the typically vertically fed bonding wire 15 and guide it under the tool tip 3 of the tool 2. The first wire guiding module 10 provides an elongated guide channel for the bonding wire 15, which, where it is closed on the outer surface side, is defined by two housing components of the first wire guiding module 10.

The second wire guiding module 20 is provided between the wire feed 7 and the first wire guiding module 10. It provides an elongated guide channel 22 with an inlet opening 23, facing the wire feed 7, for the bonding wire 15 and with an outlet opening 24 facing the first wire guiding module 10.

Figure 5:
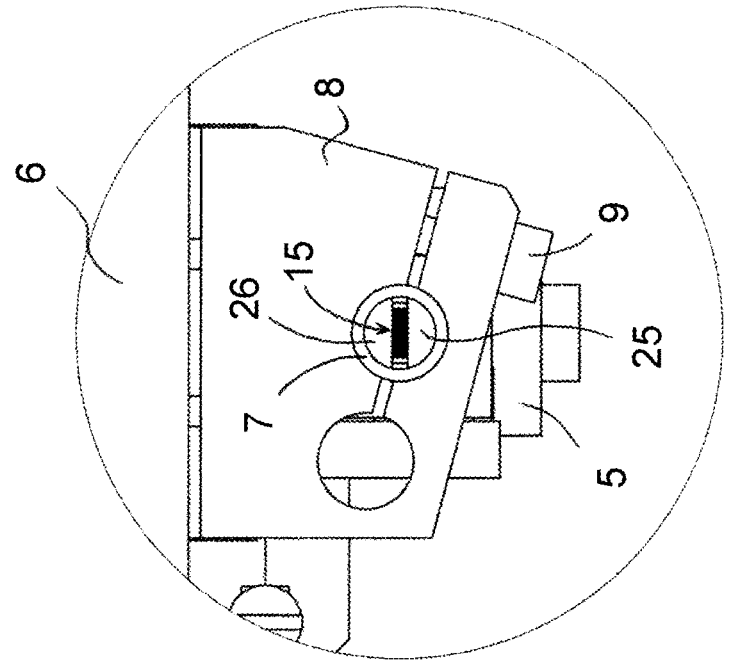
FIG. 5 shows the detail X according to FIG. 3 with a bonding wire in the wire guiding module.
Figure 4:
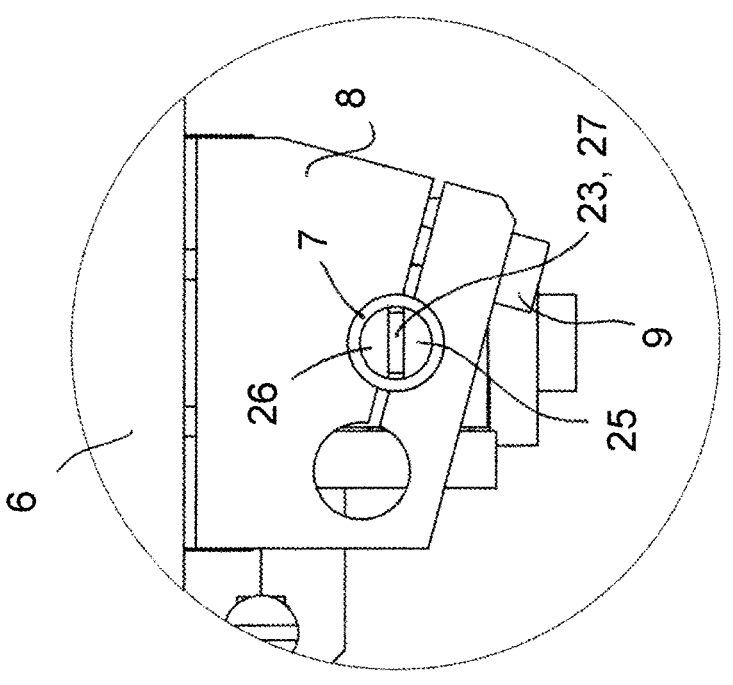
FIG. 4 is an enlarged view of a detail X of the bonding head according to FIG. 3.
Figures 6, 7, 8, 9, 10, 11:
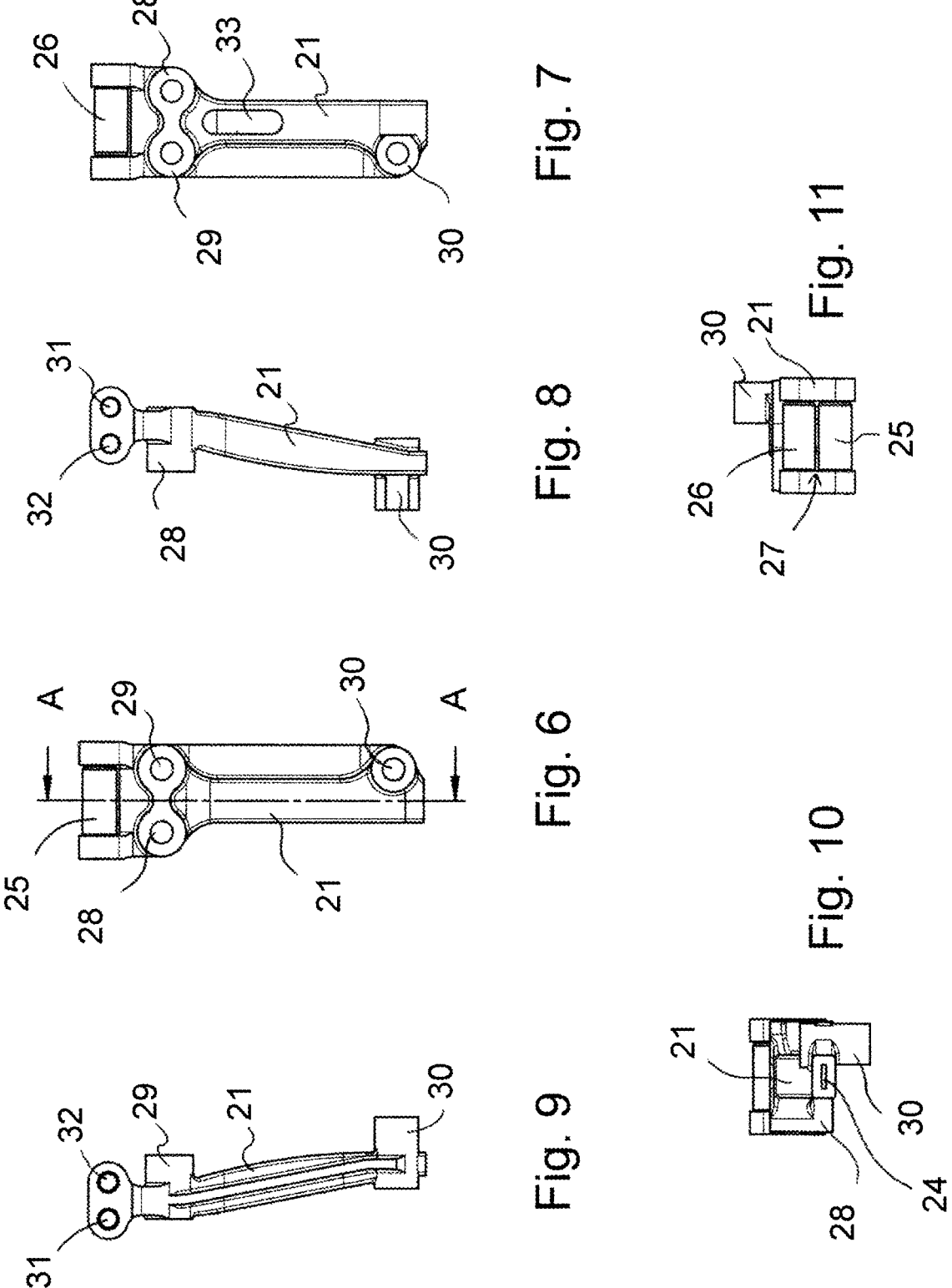
FIG. 6 is a front view of the wire guiding module of the bonding device according to FIG. 1.
FIG. 7 is a rear view of the wire guiding module according to FIG. 6.
FIG. 8 is a first connection side view of the wire guiding module according to FIG. 6.
FIG. 9 is a second connection side view of the wire guiding module according to FIG. 6.
FIG. 10 is an underside view of the wire guiding module according to FIG. 6.
FIG. 11 is a plan view of the wire guiding module according to FIG. 6.
Figure 12:
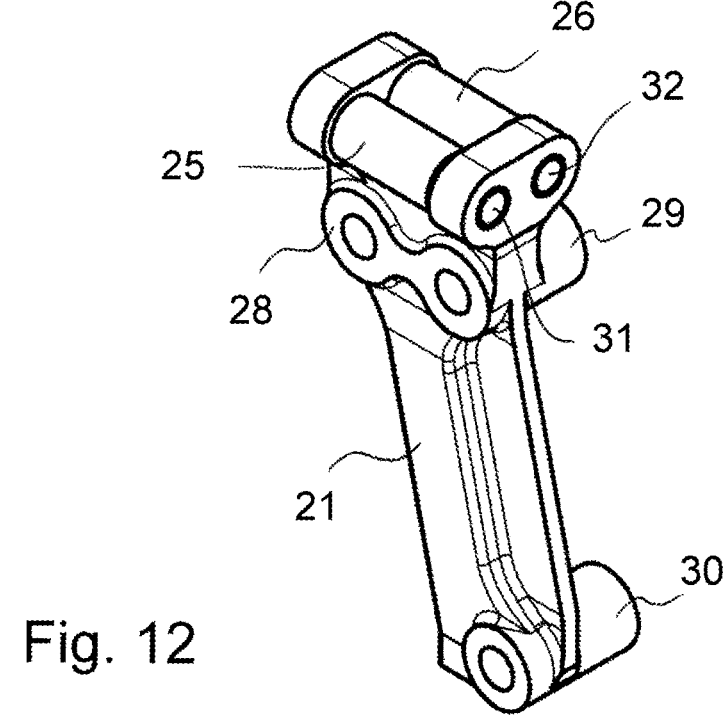
FIG. 12 is a perspective view of the wire guiding module of the bonding device according to FIG. 6.
Figure 13:
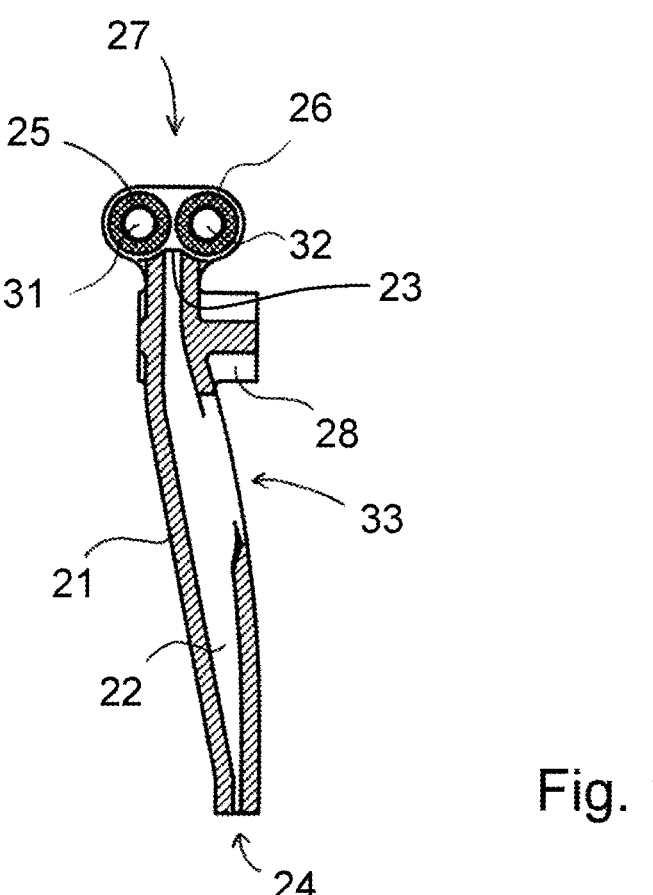
FIG. 13 is a section A-A through the wire guiding module according to FIG. 6.

The detail X according to FIG. 3 is shown enlarged in FIG. 4 without the bonding wire 15 and in FIG. 5 with the bonding wire 15. It can be seen that the wire feed 7 is arranged in alignment with the inlet opening 23 of the second wire guiding module 20, and the bonding wire 15 is fed to the inlet opening 23 substantially centrally or in the middle.

An end portion, facing the second wire guiding module 20, of the wire feed 7 is fixed to the module carrier 6 of the bonding head 1 via a holder 8. A clamping screw 9 is used to secure the wire feed 7 to the holder 8.

FIGS. 6 to 13 show various views and a longitudinal section through the second wire guiding module 20 of the ultrasonic bonding device. The second wire guiding module 20 provides a monolithic module body 21 which provides the elongated guide channel 22. The bonding wire 15 enters the guide channel 22 through an inlet opening 23 and leaves it through the outlet opening 24.

Two guide rollers 25, 26 are provided upstream of the inlet opening 23 of the guide channel 22, which are supported on the module body 21 via two mutually parallel pins 31, 32 and which are rotatable relative to the module body 21. The guide rollers 25, 26 have a cylindrical lateral surface and a constant distance from each other. A gap 27 for the bonding wire 15 is formed between the guide rollers 25, 26. The gap 27 has a constant gap width. The gap width is slightly larger than the thickness of the bonding wire 15. For example, the gap 27 is 50 μm wider than the bonding wire 15 is thick.

The monolithic module body 21 is manufactured by primary forming from a plastic material using an additive manufacturing process. In order to be able to remove powdery or granular raw material from which the module body 21 is made from the guide channel 22 of the module body 21 after production, the module body 21 provides a window-like, elongated hole-shaped recess 33 leading to the guide channel 22. The raw material can be removed from the guide channel 22 via the recess 33.

A total of three fastening bushings 28, 29, 30 are provided on the module body 21. The fastening bushings with their cylindrical through-holes serve as receptacles for fastening means, which in turn serve to fasten the second wire guiding module 20 to the module carrier 6 of the bonding head of the ultrasonic bonding device. Screws, for example, are provided as fastening means.

The guide channel 22 has a substantially rectangular cross-section. The cross-section is largest where the recess 33 is provided. It tapers both in the direction of the inlet opening 23 and in the direction of the outlet opening 24.

Identical components and component functions are identified by the same reference signs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Bonding head
2 Tool
3 Tool tip
4 Transducer module
5 Tool receptacle
6 Module carrier
7 Wire feed
8 Holder
9 Clamping screw
10 First wire guiding module
15 Bonding wire
20 Second wire guiding module
21 Module body
22 Guide channel
23 Inlet opening
24 Outlet opening
25 Guide roller
26 Guide roller
27 Gap
28 Fastening bushing
29 Fastening bushing
30 Fastening bushing
31 Pin
32 Pin
33 Recess
40 Rotational axis
41 Movement axis
42 Movement axis
43 Movement axis

The invention claimed is:

1. An ultrasonic bonding device, comprising:
   a bonding head at least one of movable and positionable in at least one movement axis and at least one of rotatable and positionable about a rotational axis, the bonding head comprising a tool configured to ultrasonically bond a bonding wire and a transducer module configured to excite the tool to produce ultrasonic vibrations;
   a stationary wire supply for the bonding wire;
   an elongated wire feed that is cylindrical in cross-section;

a first wire guiding module having an inlet opening and an outlet opening for the bonding wire, the first wire guiding module being associated with the tool such that bonding wire emerging from the outlet opening is guided under the tool; and a second wire guiding module having an elongated guide channel for the bonding wire, the elongated guide channel having an inlet opening and an outlet opening, the second wire guiding module being provided between the elongated wire feed and the first wire guiding module, wherein the first and the second wire guiding modules each comprise part of the bonding head, wherein, on the bonding head, a holder is provided by which an end of the elongated wire feed facing the second wire guiding module is fixed on the bonding head, wherein the bonding head provides a module carrier on which the holder for the elongated wire feed and the second wire guiding module are fixed adjacently to one another, wherein the first wire guiding module is held on the module carrier, and wherein the first and the second wire guiding modules are fixed with respect to the tool and the transducer module so as to movable together with the tool and the transducer module.

2. The ultrasonic bonding device of claim 1, wherein at least one of:

a distance of the elongated guide channel to the rotational axis changes in an extension direction of the elongated guide channel, a distance of the elongated guide channel to the rotational axis is smaller in a region of the inlet opening than in a region of the outlet opening.

3. The ultrasonic bonding device of claim 1, wherein the inlet opening of the elongated guide channel of the second wire guiding module is provided coaxially to the rotational axis.

4. The ultrasonic bonding device of claim 1, wherein at least one of the tool and an end portion of the elongated wire feed facing the second wire guiding module at least one of extend longitudinally in a direction of the rotational axis and are arranged at least one of coaxially to one another and coaxially to the rotational axis.

5. The ultrasonic bonding device of claim 1, wherein the transducer module is held on the module carrier.

* * * * *